United States Patent
Slemon et al.

[11] Patent Number: 5,191,208
[45] Date of Patent: Mar. 2, 1993

[54] FIBER OPTIC SENSOR SYSTEM WITH A REDUNDANCY MEANS AND OPTIMIZED THROUGHOUT

[76] Inventors: Charles S. Slemon, 1130 Island View La., Encinitas; William M. Lafferty, 571 D Hygeia Ave., Leucadia, both of Calif. 92024; Clark C. Guest, 11524 Alkaid Dr., San Diego, Calif. 92126

[21] Appl. No.: 764,215

[22] Filed: Sep. 23, 1991

Related U.S. Application Data

[62] Division of Ser. No. 436,765, Nov. 15, 1989, Pat. No. 5,051,578.

[51] Int. Cl.$^5$ ............................................... H01J 5/16
[52] U.S. Cl. ............................. 250/227.21; 250/227.23; 250/227.24
[58] Field of Search ................ 250/227.23, 227.21, 250/227.24, 226, 227.28; 385/12, 46, 48, 42, 45

[56] References Cited

U.S. PATENT DOCUMENTS

| | | | |
|---|---|---|---|
| 4,356,448 | 10/1982 | Brogardh et al. | 250/227.23 |
| 4,459,022 | 7/1984 | Morey | 250/227.28 |
| 4,596,925 | 6/1986 | Gilby | 250/227.23 |
| 4,703,175 | 10/1987 | Salour et al. | 250/227.23 |
| 4,760,250 | 7/1988 | Loeppert | 250/227.23 |
| 4,888,480 | 12/1989 | Dakin et al. | 250/227.23 |
| 4,907,857 | 3/1990 | Giuliani et al. | 250/227.23 |
| 5,031,985 | 7/1991 | Shinoda et al. | 250/227.28 |

*Primary Examiner*—David C. Nelms
*Assistant Examiner*—Michael Messinger
*Attorney, Agent, or Firm*—Dickinson, Wright, Moon, Van Dusen & Freeman

[57] ABSTRACT

A dual wavelength fiber optic monitoring system utilizes the principle of conservation of throughput to permit the use of a plurality of transducers illuminated by a single source unit. Redundancy is provided by using a plurality of sources and detector units and by the use of optical couplers to transmit the light beams between these elements.

3 Claims, 4 Drawing Sheets

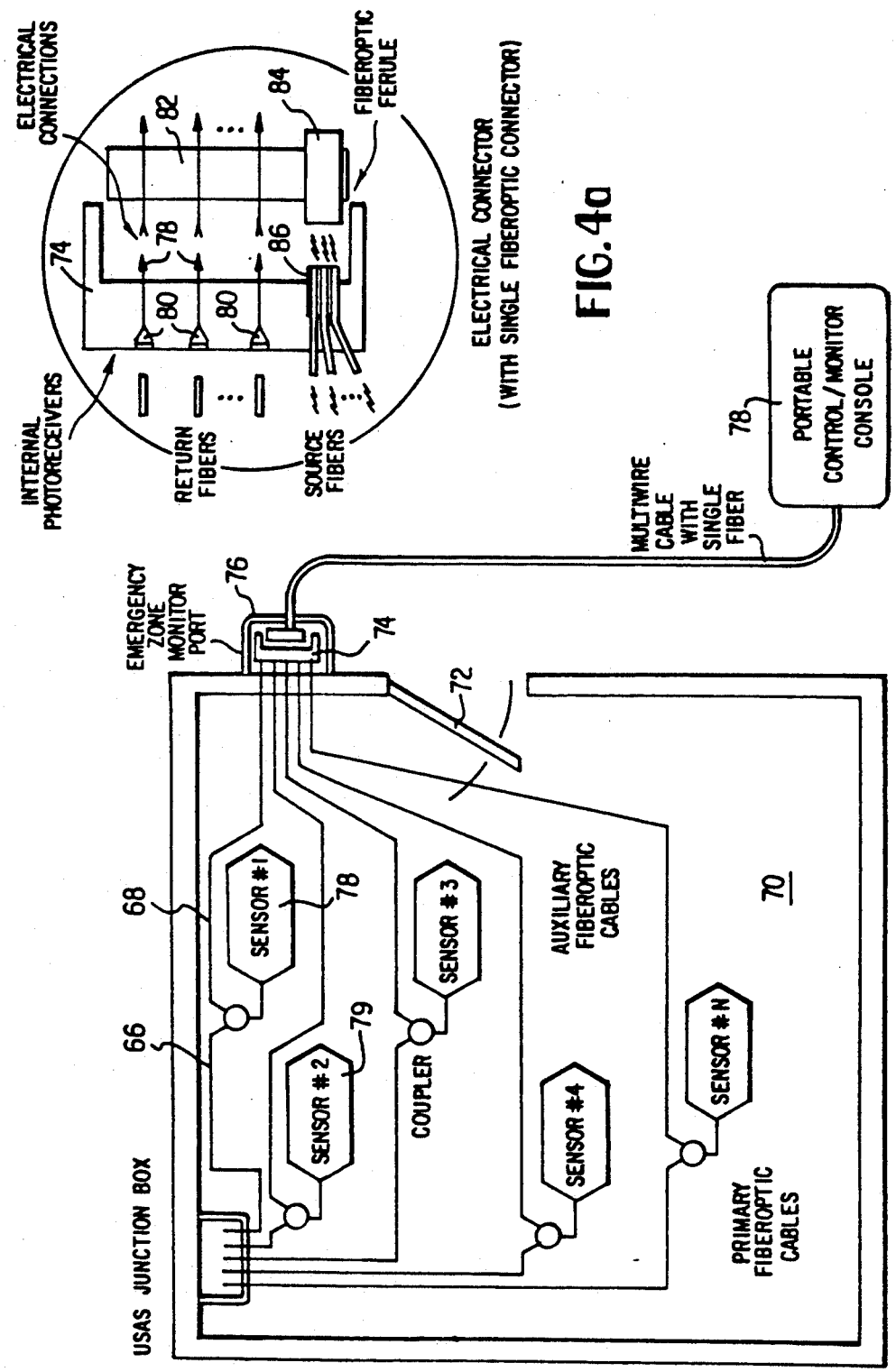

FIBER OPTIC SENSOR SYSTEM WITH A REDUNDANCY MEANS AND OPTIMIZED THROUGHOUT

This is a division of application Ser. No. 436,765 which was filed on Nov. 15, 1989, and is now U.S. Pat. No. 5,051,578.

TECHNICAL FIELD

This invention relates to the art of fiber optic sensing. In particular, the invention relates to a fiber optic network having multiple light sources, transducers and sensors.

BACKGROUND ART

The use of fiber optic elements for sensing a variety of parameters is known. The typical element is the fiber which transmits light from a source to a transducer and then to a detector. The transducer alters a characteristic of the light transmitted by the fiber, usually intensity, and the detector produces a signal which is a measure of a selected parameter to which the transducer is sensitive.

Fiber optic sensors have many characteristics, such as size, weight, electromagnetic isolation, safety, and ease of installation which make them desireable for a variety of uses, such as for a monitoring and control system on a ship.

In a typical system, the input light is modulated, and the sensor filters out the detected signal at the frequency of modulation. This system eliminates the effects of intensity fluctuations in the source. Another technique is to provide two sources at different wavelengths and which are modulated at different frequencies. According to this technique, one of the wavelengths is chosen such that it is affected by the transducer to measure the parameter of choice. The second wavelength is selected so that it is not affected by the transducer but is affected by other factors in the system in the same fashion as the first wavelength. Thus, the second wavelength acts as a reference to indicate all variations in the intensity of the light which are not related to the parameter being measured. The ratio of the intensities of the two wavelengths can be obtained by filtering the output signals produced by the detector at the two modulating frequencies and by determining the ratio of the measured intensities as a measure of the selected parameter.

While basic fiber optic measuring systems have been used in a variety of situations, they have not generally been used in a network which provides great facility in substitution of light sources, transducers, or detectors, or which provides the redundancy necessary for safety.

SUMMARY OF THE INVENTION

In accordance with the invention, a dual wavelength, self calibrating fiber optic monitoring system is designed in accordance with a systems concept to provide redundancy and to conserve throughput in the system.

Intensity modulated fiber optic transducers are usually unstable because of their inevitable variations in illumination power and light loss in the fiberoptic telemetry. The instrument according to the invention, on the other hand, is self calibrating in that it automatically tracks and compensates for instabilities at the systems level. This is accomplished by the use of a dichroic (i.e. two color) design. The light source preferably comprises two emitters of light of respective different wavelengths. One color is the signal channel, and the second color serves as a reference channel tracing exactly the same path as the signal channel except that it is not affected by the transducer.

The monitor determines the ratio of the power in each color channel to produce a true reading of the effect of the transducer. The reading is insensitive to non-transducer related system variations since they are "common mode" and cancel out to result in self calibration.

The unique advantages of the arrangement according to the invention extend beyond enhanced signal quality. Since the ratio of the optical signals' strength can be measured independently of the absolute magnitude of the signal power, many monitoring stations can now tap into the return line(s); the resultant dilution of the optical power levels will not significantly affect the reading. This allows any sensor channel to have redundancy, local readouts, and maintenance test ports. Moreover, the reference channel offers a simple self-diagnostic measure of "link health". For example, a weakened reference channel corresponds to a system fault. Its location and required repair steps can then be automatically specified. The invention's design inherently permits the use of built in test equipment that in other systems must be specially added.

The basic monitoring system according to the invention is composed of a source unit, a monitor, and telemetry.

The basic source unit is composed of the electronic drive circuitry, two emitters, one each for the reference and signal wavelengths, and the fiber optic coupler. The drive circuitry uses electronic multiplexing techniques to separately modulate each emitter. By using electronic multiplexing, the signals from each emitter can be optically combined and still be individually separated and measured using strictly electronic techniques. This is an important feature since no special color mixing or separating functions or devices are needed anywhere in the system except for he transducer itself. While either frequency or time division multiplexing (e.g., the two frequencies are alternately turned on) may be used, time division multiplexing is preferred because of its ability to handle a greater dynamic range of signal-to-reference ratios.

It is noteworthy that only a single "broad band" emitter, such as an LED or incandescent light bulb, can supply both the reference and signal colors, but this would require the monitor units to use color filters and/or splitters.

The light beams from the emitters enters the fiberoptic coupler and are combined. The light emerging from the coupler therefore is composed of light of both colors—the coupler is not dichroic. The coupler can have two or more output fibers.

Accurate stabilization and monitoring of the inventive monitoring system is accomplished using a closed loop system that monitors the light as it leaves the coupler and enters the telemetry portion of the system. A special source monitor unit measures the relative power of the two wavelengths, and because the coupler is not dichroic, the relative powers of the two colors is the same in all coupler outputs though their total power is not necessarily so. This measurement provides an initial ratio (i.e. a scaling or "normalizing" factor) against which the ratios of the light beams returning from the various transducers are eventually compared. The source monitor unit can be an independent module or an integral part of the drive circuitry.

To automatically stabilize the relative optical power between each emitter, the source monitor outputs are used as error signals for a servo within the drive circuitry. A variety of servo techniques can be used to either track the power of one color to that of the other or, preferably, to independently maintain constant power for each emitter. The invention implements the latter using two low cost, independent automatic gain control (AGC) circuits to stabilize the power of each color coming from the coupler.

The invention is arranged to comply with the physical law of conservation of throughput, which states that efficient coupler operation requires equal numbers of input and output fibers. This allows the optical power going to the transducers and/or the reliability of the source units to be increased. In the case of a coupler having four or more fiber outputs, throughput conservation allows the multiple input fibers to be connected to separate emitters, say two reference and two signal. These duplicate emitters can be used in parallel to double the optical power or be withheld as a spare for use when needed. Moreover, if the emitters are not lasers, throughput conservation allows some of the emitter light normally not coupled into one fiber to be coupled into other fibers. More specifically, since the throughput of the emitter exceeds that of the fiber, the excess (and normally wasted) emitter throughput can be coupled into additional fibers. For example, most LEDs and all incandescent light bulbs are large enough for two or three fibers to fit over their emissive areas. By placing multiple input fibers over the same emitter, more power can enter the coupler for the same LED. A preferred situation arises for a coupler with twelve output fibers. Normally, each output fiber would have at most one-twelfth of the power coupled by each emitter into its single input fiber. However, by grouping the twelve input fibers into four sets of three fibers each, two LEDs of each color can be connected to the coupler with each LED shining on three fibers—resulting in as much as six times the power while only doubling the number of emitters.

Whenever additional emitters are used, system reliability is increased.

The monitor units in accordance with the invention use only a single photoreceiver to convert the optically combined reference and signal light into an equivalent electronic signal. The two electronic signals are then separated using traditional electronic demultiplexing methods. Electronic demultiplexing with a single photoreceiver is less expensive, more stable, and more accurate than is the dichroic method of separating the colors and using dual photoreceivers. Furthermore, any errors or fluctuations in a single photoreceiver will be common mode and will cancel out upon taking their ratio. In contrast, the inevitable differences that exist between two dichroic photoreceivers will generate permanent errors and hinder self-calibration. If the two emitters are not electronically multiplexed, separate photoreceivers, couplers, and color filters will be needed for each color.

A large variety of standard electronic techniques exist to ensure accurate demultiplexing. These include synchronization to the driver circuit using a dedicated data link, self-synchronization via an appropriate modulation scheme, or pretuned or pretimed detection. Self-synchronization is preferred but requires a multiplexing scheme that distinguishes between the reference and signal channels. For frequency division multiplexing (FDM) where each color is modulated at a unique frequency, self-synchronization is readily accomplished, e.g. using tuned circuits or phase-locked loops. For time division multiplexing (TDM) in which the two colors are sequentially turned on and then off, self-synchronization can be accomplished using an asymmetric modulating scheme; e.g. the on-time and/or off-time for the signal color differs from those for the reference color.

Electronically calculating the relative power of each color can also be accomplished in a variety of ways. These include digitizing the power of each channel and using digital electronics or processors to perform the division. Alternatively, analog voltage dividers can be used. A low cost, accurate analog technique is to use an AGC circuit to adjust the gain of the photoreceiver so as to maintain the output voltage of the reference channel at some convenient voltage, say 1 volt. In this way, the voltage of the signal channel directly measures, in voltage units, the ratio of the two channels.

For TDM, electronic gain switching circuitry can be conveniently added to the photoreceiver. In this way, a large dynamic range between the two optical powers can be accommodated. For example, the photoreceiver can be programmed to have a unit gain for the relatively stable reference color while for the varying and sometimes smaller signal color, the receiver's gain can be automatically switched between one and one thousand so that its output voltage is well within the normal range of the follow-on electronics or digitizer. Of course, the gain setting will have to be included in he final ratio. Gain ranging can also be used in FDM though it is more complicated.

A measure of "link health" can be made by measuring the strength of the reference color as it reaches the monitor unit. If the reference channel is weaker than should normally be expected, the optical circuit for that particular transducer warrants examination and, perhaps, repair. Such built in test equipment is inherently part of all monitor units and can be explicitly included in any monitor unit with its own automatic circuitry and dedicated electrical output or it can simply be a manual measurement made by a technician in the course of normal system maintenance.

The telemetry aspects of the system according to the invention includes the fibers, reference and signal wavelength selection, transducer interface, and architectural flexibility. Many of these aspects effect practical operational characteristics that are important to the actual system user.

Virtually any multimode optical fiber can be used with the invention. High throughput fibers are preferred to maximize the optical power supplied to and returned from the fiberoptic transducers. For reasons explained below, however, the transducers should have even greater throughput. Therefore, the telemetry benefits most from moderate throughput fibers, e.g. those with 100 micrometer to 200 micrometer core diameters with large numerical apertures. High bandwidth fibers are not needed. Fiber loss rates need not be particularly low either since the typical telemetry ranges are relatively short; 10 dB/km is often adequate.

The reference and signal wavelength can be any colors that allows transducer performance to be deduced by obtaining ratios, as discussed above. It is convenient for the reference color to be totally unaffected by the transducer, though this is not necessary.

An extremely useful feature of the invention is that the reference color acts both like an optical loss monitor against which link losses can be checked and like an "optical ground" from which transducer performance can easily be measured from anywhere in the optical telemetry circuit. Without a dedicated reference color, such a feature is not practical.

Another useful feature of the invention is that the reference color can be visible, say red, instead of near infrared as is typical in fiber optic systems. In this way, a person installing, inspecting, or adjusting the monitoring system can visually check circuit continuity. If red light is seen emanating from the telemetry fiber, the installer or inspector can be reasonably certain that the optical circuity is functioning correctly.

Fiber optical transducer interface requirements involve both operating wavelength and the throughput of the fiber used in the transducer. The transducer and signal wavelength must be matched to ensure proper transduction by the parameter being sensed on the optical signal passing through it. Preferably, the reference color should be totally unaffected by the transducer. The monitoring system according to the invention will still function properly if the reference color is attenuated by the transducer so long as such is at a different rate than that of the signal color.

The optical throughput of the transducer is normally limited to the fiber used within it. This fiber can be any multimode fiber, but maximum optical efficiency occurs when the throughput of the transducer fiber equals that of the telemetry system. A noteworthy situation arises when the transducer fiber has a core diameter of 200 micrometers and a numerical aperture of 0.37 and the telemetry fiber has a core diameter of 100 micrometers and a numerical aperture of 0.45. In this case, the throughput of the transducer fiber is over six times that of the telemetry fiber, so six telemetry fibers can be efficiently coupled to a single transducer fiber. This allows use of a special coupler for the invention which has six 100 micrometer fibers fused to a single 200 micrometer fiber. By connecting the large fiber in the coupler to the transducer, six ports are acquired that can be used for either inputs or outputs. Input redundancy can be obtained by connecting multiple fibers to one or more source units. Output redundancy can be obtained by connecting multiple fibers via separate paths to a single monitor unit. Similarly, a single transducer can have multiple monitor units connected to it including those for local sensor displays, test ports, or emergency access.

BRIEF DESCRIPTION OF THE DRAWINGS

FIG. 1a is a diagram of a reflective transducer in accordance with the invention.

FIG. 4 is a schematic diagram of a fourth embodiment of the invention.

FIG. 4a is a diagrammatic side view of an emergency port used in the embodiment of FIG. 4.

DETAILED DESCRIPTION OF THE INVENTION

Figure 1:
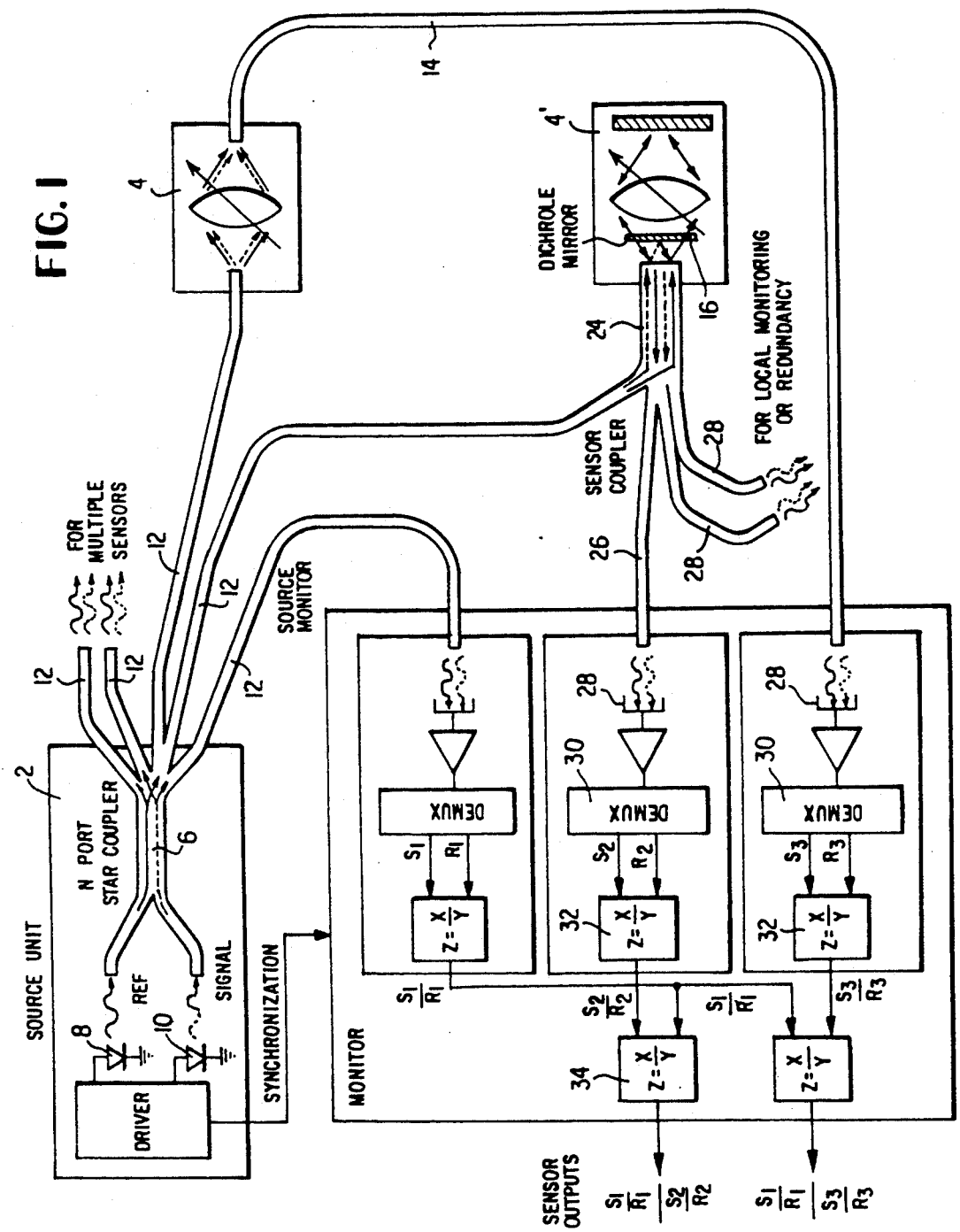
FIG. 1 is schematic diagram of a first embodiment of a system in accordance with the invention.

With reference to FIG. 1, a single, conveniently located, self-contained source unit 2 is used to provide dichroic illumination to several dispersed transducers 4. An optical coupler 6 receives two light beams of different frequencies from sources 8 and 10, which are preferably LEDs each of which emits light at a different frequency. The coupler combines the light beams and couples it into a plurality of output fibers 12 in a manner such throughput is conserved. The fibers 12 branch out from the source unit and selected ones are optically coupled to respective transducers 4. The light from the transducers is recombined and transferred via separately cabled fibers 14 to a central monitoring station. Alternatively, the central monitoring station can be replaced by independent, self-contained monitoring units that are also conveniently located; for large ships, this could be Engineering, Damage control, Bridge, etc.

A first of the transducers is shown as a transmissive transducer. This type of transducer provides an optical element, shown as a lens traversed by an arrow, which changes its focal length in accordance with a parameter to be measured. For example, if the parameter is force, an applied force may be used to move the lens in a predetermined manner to alter the intensity of the light beams traversing the transducer. The second transducer 2' operates in a reflective mode. A dichroic mirror 16 is placed at the input to reflect the reference wavelength so that it does not traverse the transducer.

A preferred transducer is illustrated in FIG. 1a. In accordance with this embodiment, light is incident upon a prism 18 made of didymium, a material with the property that light of a selected wavelength will pass with very little effect and light of a second selected wavelength will be absorbed to a calibrated degree. A lens 20 is used to image the end of the input fiber 12 onto a mirror 22 such that the light which has passed through the prism and the lens will be returned to the end of the fiber without significant alignment error. The fiber in this example is located a distance of twice the focal length of the lens from the lens, and the mirror 22 is similarly located at a distance of twice the focal length.

With reference to FIG. 1 again, an optical coupler 24 receives light from the sources 8 and 10 via fiber 12. Coupler 24, by conserving throughput, directs the light onto the transducer and divides the output among the number of fibers necessary to conserve throughput. This is designed to result in the provision of at least one fiber 26 which is directed to a detector 28 for electrical processing by a demultiplexer 30 and ration determining electronics 32 and 34. Other fibers 28 are used for redundant detectors, or for redundant light sources. It will be appreciated that if the sources 8 and 10 were to fail, the system could be made operational by supplying one of the fibers 28 with light from a source similar to sources 8 and 10.

Figure 2:
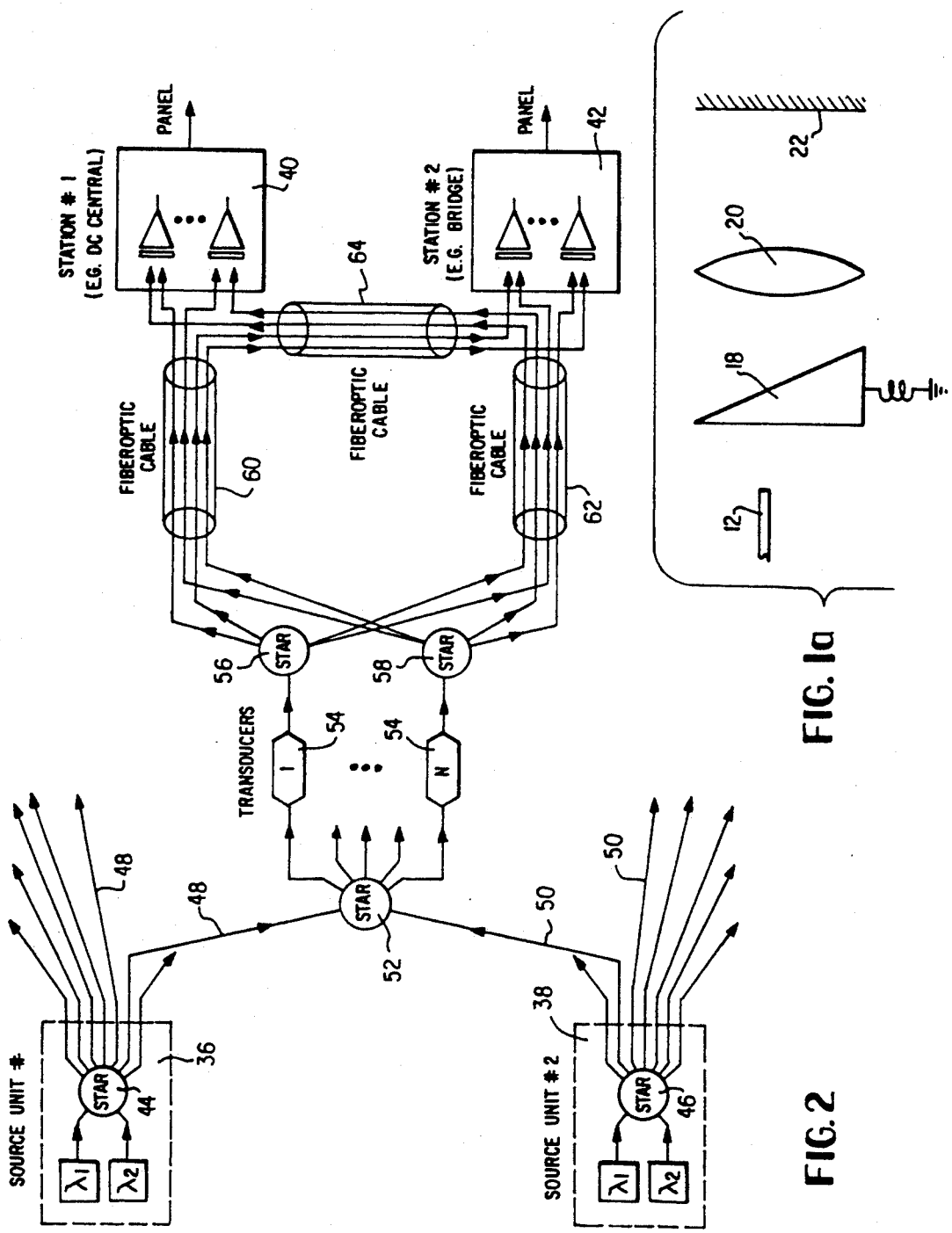
FIG. 2 is a schematic diagram of a second embodiment of a monitoring system in accordance with the invention.

Monitoring system reliability and survivability can be increased in accordance with the system of the invention by adding redundancy. With reference to FIG. 2, two separately located, independent source units 36 and 38 and monitor stations 40 and 42 are integrated into a single system. Each source unit includes two LEDs such as that described with respect to FIG. 1. Optical couplers 44 and 46 divide the light beams among a plurality of fibers 48 and 50. A coupler 52 receives light from the two source units and directs the combined beams to a plurality of transducers 54. Couplers 56 and 58 distribute the light from the transducers to the two detector units 40 and 42 by fiber optic cables 60, 62, and 64. This allows multiple return fibers from each transducer to be separately routed to their respective monitor units. The entire system to and from each transducer is totally redundant, and it takes at least two failures before system degradation begins. In the least damaging case, both return fibers for the same transducer must fail, and then only that transducer is lost. In the most severe case, both source units or their optical fibers must fail, and then all the transducers illuminated by these sources units are lost.

The fiber optical coupler 52 which combines the two sources also serves to fan out the optical illumination power to the transducers 54. This compound "star" network economizes on cables while increasing network capacity.

Figure 3:
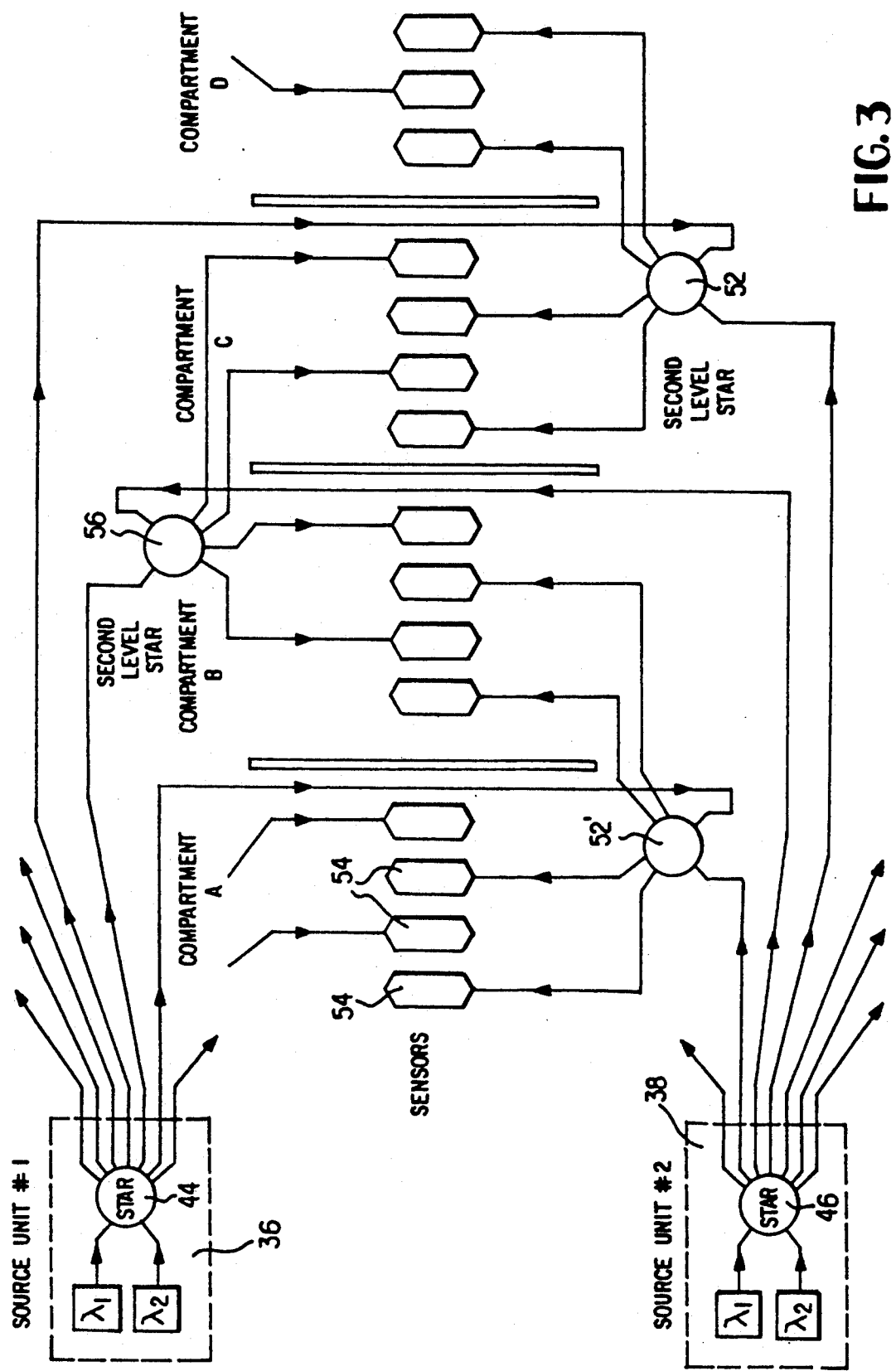
FIG. 3 is a schematic diagram of a third embodiment of the invention.

FIG. 3 illustrates how additional reliability can be gained by overlapping the zone coverage with two source units. Here, two independent systems share the monitoring duties. If one system fails, only part of the sensors are lost, i.e. the system gets diluted.

FIGS. 4 and 4a show how a monitoring system in accordance with the invention can enhance operation, for example on a ship, during an emergency or for damage control. Two source fibers 66 and 68 are used for all transducers within a compartment 70, such as a room having a door 72. Fibers 66 are connected to a normally used monitoring system such as those shown in FIGS. 1 through 2, and fibers 68 connect the transducers to an emergency zone monitor port 74. This port is preferably a special fiber optic junction box located at the compartment entrance way. The box may be mounted on the bulkhead of a ship outside the compartment 70, and may be covered by a protective element 76. In the event that the telemetry system fails, due to damage or equipment failure, the transducers 78 within the compartment could still be accessed via the emergency zone monitor port 74 by using a small, portable control/monitor console 78 that contains its own fiberoptic source units, monitor units, electrical power, and all other necessary electronic functions described above. One implementation of this embodiment is shown in FIG. 4a. The emergency port 74 comprises a plurality of electrical pin connector elements 78 which are connected to electronic light detectors 80 that convert the light power emerging from each of the return fibers 68 into electrical signals. The portable console has a mating electrical connector 82 which plugs into the emergency port 74. The light detectors receive all their electrical power from and send all their electronic signals to the portable console via this connector.

Thus, the portable console 78 can quickly and reliably be connected to the monitor telemetry by using traditional electronic methods. The portable console is provided with a source of illumination which is transmitted into the port by fiber 84 and which matches with source fibers 86. To accomplish this, one electrical pin in each of the connectors is replaced by a single fiberoptic connector ferrule (i.e. a hollow pin to hold the fibers). All the transducer source fibers 86 are bundled into the one ferrule in the emergency port's electrical connector. The ferrule in the portable console's connector contains the output pigtail fiber from the console's own source unit.

The emergency zone monitor port and portable control/monitoring console allow a damage control team, completely on its own, to quickly access and interrogate the transducers and assess the situation before opening the hatch to the compartment.

It will be appreciated that a unique fiber optic monitoring system which finds particular utility in applications such as aboard a ship has been described. Modifications within the scope of the appended claims will be apparent to those of skill in the art.

We claim:

1. A fiber optic detection system comprising:
   source means for producing a light beam,
   coupling means for coupling said light beam into a transducer for measuring a physical parameter, and
   redundancy means connected to said transducer for directing light from said transducer to a plurality of optical fibers, and
   detector means for receiving light from said plurality of optical fibers, the optical throughput of said detector means being at least equal to the optical throughput of said plurality of optical fibers,
   wherein at least one of said plurality of optical fibers traverses a physical path substantially different from that of other of said plurality of optical fibers.

2. A fiber optic detection system according to claim 1 wherein said light beam comprises light of two different frequencies.

3. A fiber optic detection system according to claim 2 further comprising
   second source means for producing a second light beam,
   coupling means for coupling said light beam into said transducer, and
   redundancy means connected to said transducer for directing light from said transducer to a plurality of second optical fibers,
   wherein at least one of said plurality of second optical fibers traverses a physical path substantially different from that of other of said plurality of second optical fibers.

* * * * *